US012667184B2

(12) United States Patent
Leet

(10) Patent No.: US 12,667,184 B2
(45) **Date of Patent: \*Jun. 30, 2026**

(54) FASTENER SYSTEM FOR SLATTED CONSTRUCTION

(71) Applicant: Patrick John Leet, Plainwell, MI (US)

(72) Inventor: Patrick John Leet, Plainwell, MI (US)

( * ) Notice: Subject to any disclaimer, the term of this patent is extended or adjusted under 35 U.S.C. 154(b) by 248 days.

This patent is subject to a terminal disclaimer.

(21) Appl. No.: 18/581,276

(22) Filed: Feb. 19, 2024

(65) Prior Publication Data

US 2024/0188712 A1 Jun. 13, 2024

Related U.S. Application Data

(63) Continuation-in-part of application No. 18/392,721, filed on Dec. 21, 2023, now Pat. No. 12,286,990, which is a continuation of application No. 17/463,741, filed on Sep. 1, 2021, now Pat. No. 11,849,837.

(60) Provisional application No. 63/073,251, filed on Sep. 1, 2020.

(51) Int. Cl.
| | |
|---|---|
| *A47B 13/00* | (2006.01) |
| *F16B 12/14* | (2006.01) |
| *F16B 12/20* | (2006.01) |
| *F16B 12/10* | (2006.01) |

(52) U.S. Cl.
CPC ............ *A47B 13/003* (2013.01); *F16B 12/14* (2013.01); *F16B 12/20* (2013.01); *A47B 2220/0055* (2013.01); *A47B 2230/0022* (2013.01); *F16B 2012/106* (2013.01)

(58) Field of Classification Search
CPC .... A47B 2220/0055; A47B 2230/0022; A47B 2230/15; A47B 13/003; F16B 12/14; F16B 12/18; F16B 12/20; F16B 12/2063; F16B 12/24; F16B 2012/103; F16B 2012/106
See application file for complete search history.

(56) References Cited

U.S. PATENT DOCUMENTS

| | | | |
|---|---|---|---|
| 1,408,226 A | 2/1922 | Sheldon | |
| 1,786,497 A | 12/1930 | Krick et al. | |
| 3,589,784 A | 6/1971 | Willhelm | |
| 3,722,431 A | 3/1973 | Howard | |
| 4,116,573 A | 9/1978 | Fuchs | |
| 4,261,665 A | 4/1981 | Hsiung | |
| 4,299,067 A | 11/1981 | Bertschi | |
| 4,641,983 A * | 2/1987 | Strassle ................ | F16B 7/0466 |
| | | | 403/255 |

(Continued)

FOREIGN PATENT DOCUMENTS

| | | | | |
|---|---|---|---|---|
| DE | 20100582 U1 * | 4/2001 | .......... | F16B 12/2063 |
| DE | 10242247 A1 * | 3/2004 | .......... | A47B 47/042 |

(Continued)

*Primary Examiner* — Matthew R McMahon

(74) *Attorney, Agent, or Firm* — Kintner IP, LLC; Mary Frances Ludwig

(57) ABSTRACT

A fastener system for quick and easy assembly of a slatted article is used to join multiple slats and connects a support thereto. A flange inserted into one of the slats receives a stud connected to the support. A rod connects a plurality of the slats, and mates with the flange. The flange and rod are rotatable within the slats to properly position and tighten the fastener system.

12 Claims, 16 Drawing Sheets

(56) References Cited

U.S. PATENT DOCUMENTS

| | | | | |
|---|---|---|---|---|
| 4,741,135 | A | * | 5/1988 | Baena ..................... E04B 1/043 |
| | | | | 52/223.7 |
| 4,869,564 | A | | 9/1989 | Lechman |
| 4,886,326 | A | | 12/1989 | Kuzyk |
| 5,209,598 | A | * | 5/1993 | Zullig ................... F16B 7/0466 |
| | | | | 403/231 |
| 5,501,541 | A | | 3/1996 | Gomes |
| 5,802,780 | A | | 9/1998 | Hammerschlag |
| 5,816,734 | A | * | 10/1998 | Wåhlin ................. F16B 7/0466 |
| | | | | 403/231 |
| 6,808,334 | B2 | * | 10/2004 | Nicoletti ............... F16B 7/0466 |
| | | | | 403/169 |
| 8,096,430 | B2 | | 1/2012 | Lim |
| 9,456,697 | B2 | | 10/2016 | Simitian et al. |
| 10,094,404 | B2 | | 10/2018 | Chesser et al. |
| 10,273,999 | B2 | | 4/2019 | Chang et al. |
| 10,595,632 | B2 | | 3/2020 | Elliott |
| 10,767,676 | B2 | | 9/2020 | Cattaneo |
| 10,856,658 | B2 | | 12/2020 | Berloni et al. |
| 11,406,189 | B2 | | 8/2022 | Schlanger |
| 2005/0262789 | A1 | | 12/2005 | Novoa |
| 2008/0121144 | A1 | | 5/2008 | Chen |
| 2019/0142175 | A1 | | 5/2019 | Cantrell |
| 2021/0340757 | A1 | | 11/2021 | Marino |

FOREIGN PATENT DOCUMENTS

| | | | |
|---|---|---|---|
| EP | 1004259 | A1 | 5/2000 |
| EP | 2551534 | B1 | 11/2013 |
| EP | 3815574 | B1 | 1/2022 |
| EP | 3153716 | B1 | 10/2023 |
| FR | 2333991 | A1 | 7/1977 |
| FR | 2372982 | A1 | 6/1978 |
| FR | 2529819 | A1 | 1/1984 |
| FR | 2596821 | A1 | 10/1987 |
| GB | 1133931 | A | 11/1968 |
| KR | 101034662 | B1 | 5/2011 |
| WO | 1997032507 | | 9/1997 |
| WO | 2011015254 | A1 | 2/2011 |

* cited by examiner

8B

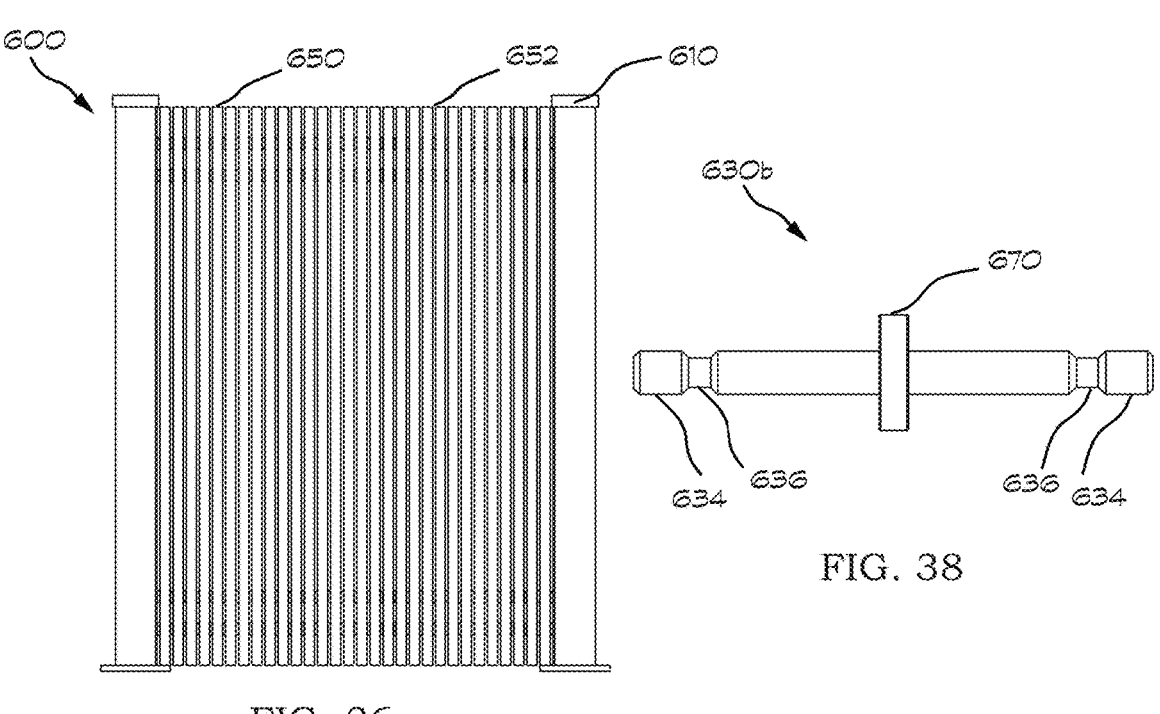
FIG. 36
FIG. 38
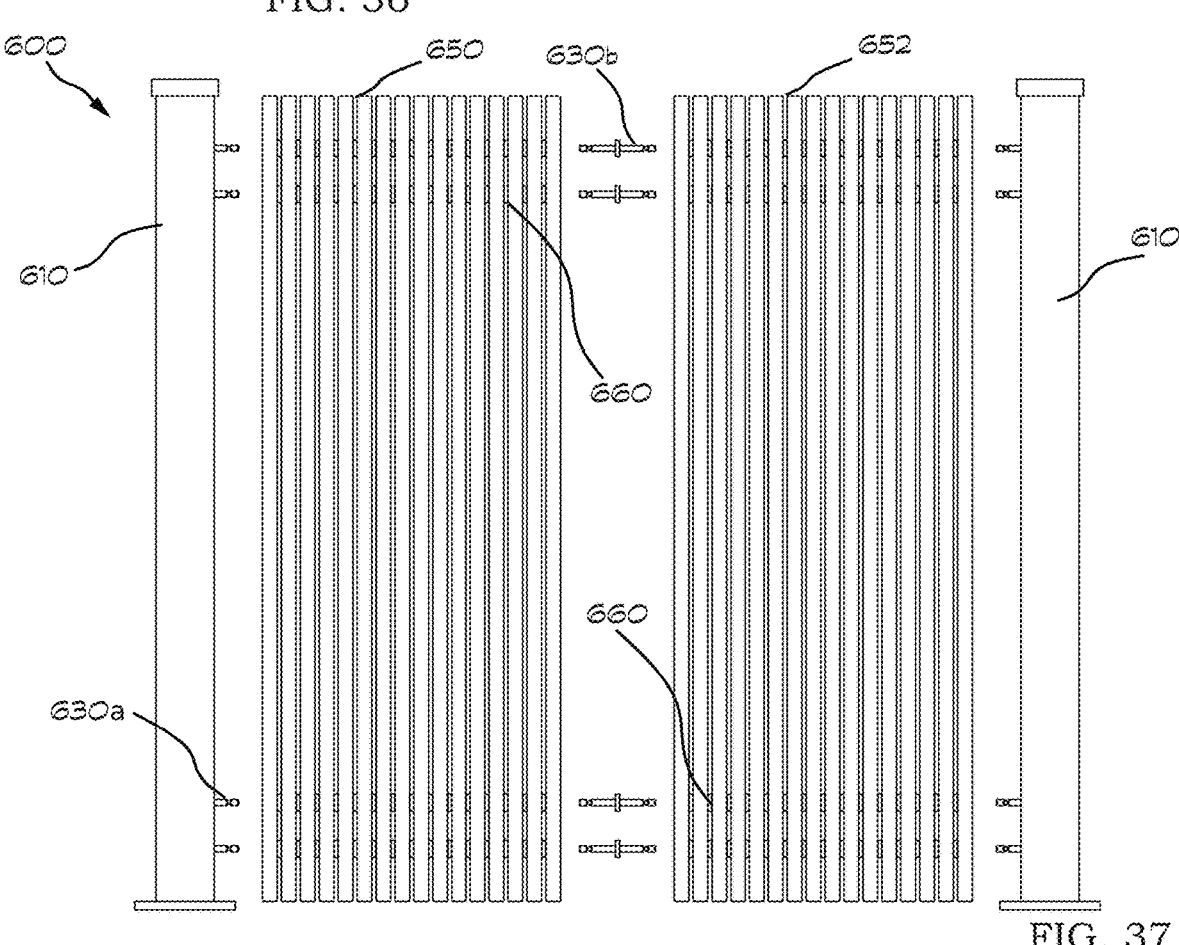
FIG. 37

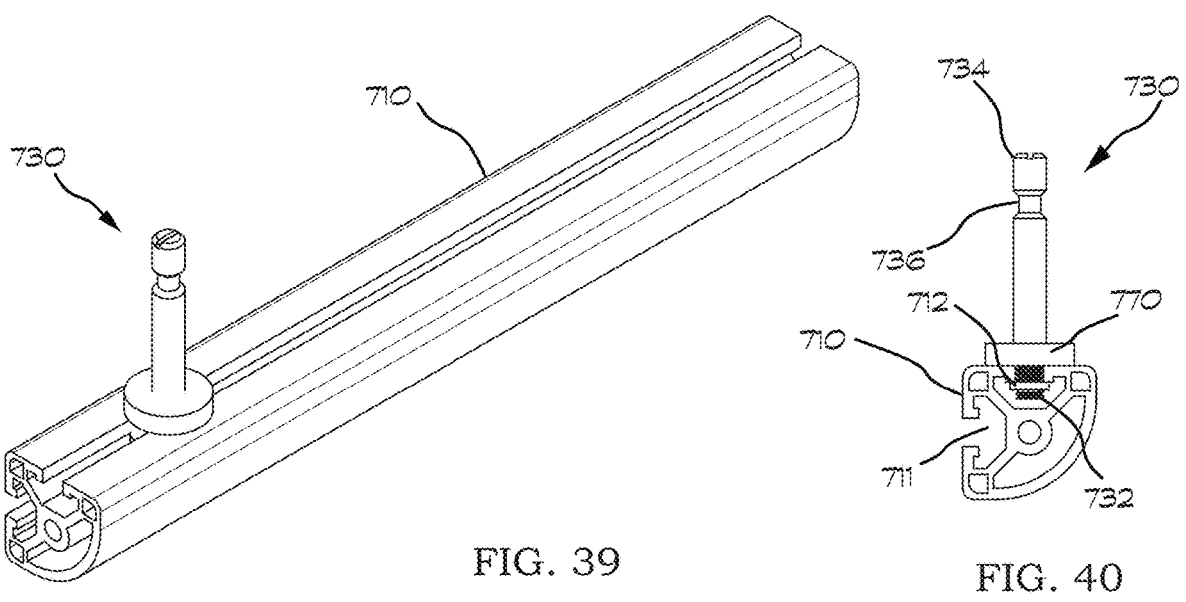
FIG. 39
FIG. 40
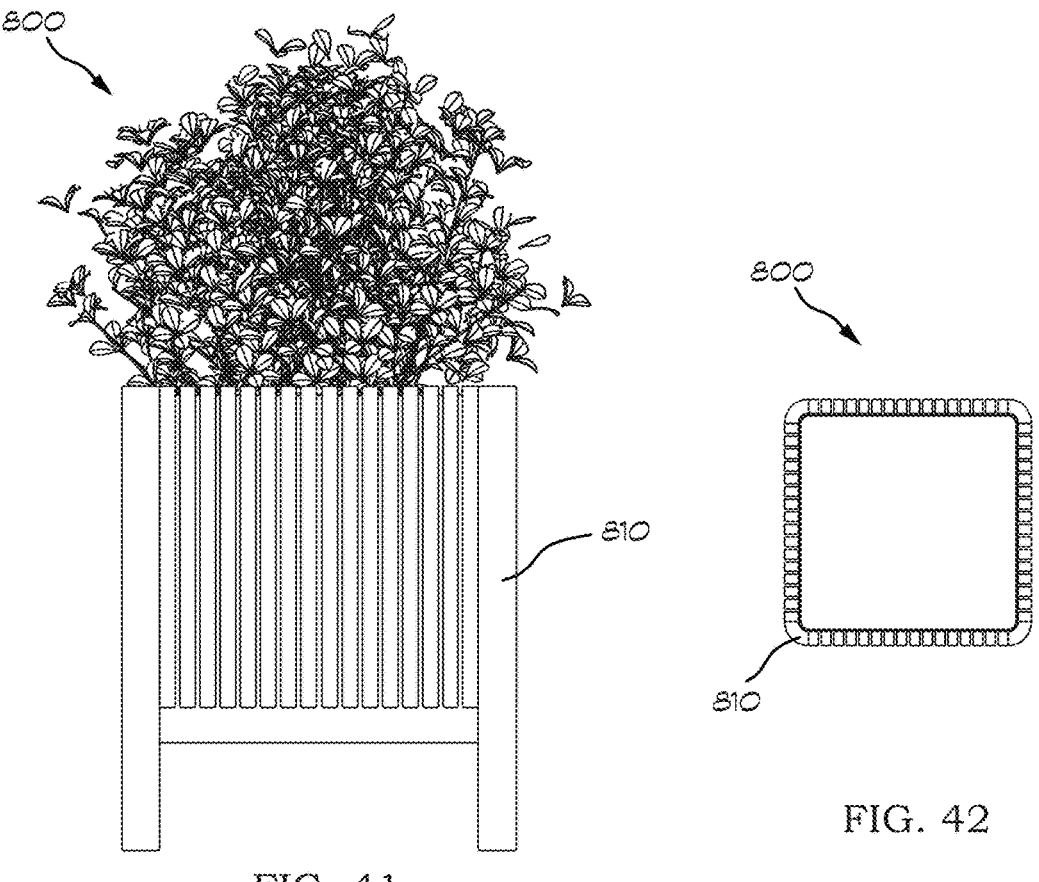
FIG. 41
FIG. 42

900

950

952

910

930

936

934

940

960

940

960

FASTENER SYSTEM FOR SLATTED CONSTRUCTION

CROSS REFERENCE TO RELATED APPLICATION

This application is a continuation-in-part of U.S. patent application Ser. No. 18/392,721 filed Dec. 21, 2023, which is a continuation of U.S. patent application Ser. No. 17/463,741, filed 1 Sep. 2021, which claims the benefit of U.S. Provisional Application No. 63/073,251, filed 1 Sep. 2020, all of which are hereby incorporated by reference in their entirety.

TECHNICAL FIELD

The present invention pertains generally to construction of slatted articles, such as furniture, architectural components, or the like, and more particularly to fastener systems therefor.

BRIEF SUMMARY OF THE EMBODIMENTS

The embodiments of a fastener system described herein provide a way to quickly and easily assemble an article having several parallel slats, such as an article of furniture, an architectural component, or the like. The fastener system joins multiple slats and connects a support (such as a leg, an extruded member, another slatted article, or the like) thereto. The fastener system may also join a support to a solid, non-slatted article, such as a furniture member, panel, or similar. The system is suitable for various types of furniture, such as a bench, table, stool, bed frame, shelf, or the like. The system is also suitable for various architectural components, such as wall and/or ceiling systems, fences, decking, walkways, docks, atriums, pergolas, and so on. Elements of the fastener system are hidden from view in the finished assembly, providing an appealing overall aesthetic.

According to one or more embodiments, a fastener system is configured to cooperate with a slatted article, the slatted article including a support and multiple slats each having a through hole. At least one of the slats may have a retainer hole. The fastener system includes:

a stud configured for connection to the support;

a flange configured for insertion into at least one slat, the flange having: a longitudinal channel having a proximal end dimensioned to receive the stud therethrough and an opposing distal end; a transverse channel oriented substantially orthogonally to the longitudinal channel and opening thereto; and an external aperture opening to the transverse channel;

a rod configured to connect a plurality of the multiple slats, the rod having a rod end which is configured to mate with the distal end of the flange;

wherein, when the stud is inserted through the flange, a portion of the stud (e.g., a notch) is positioned to align with the external aperture of the flange; and wherein, the flange is rotatable within the at least one slat to position the external aperture of the flange for access through the retainer hole.

According to one or more embodiments, the rod is configured to be freely rotatable within the through holes of the connected plurality of slats.

According to one or more embodiments, the transverse channel passes through a diameter of the flange and two opposing external apertures open to the transverse channel.

According to one or more embodiments, a retainer is configured for insertion through the external aperture of the flange into the transverse channel and engagement with the notch in the stud.

According to one or more embodiments, a notch is circumscribed around the stud.

According to one or more embodiments, a notch has sidewalls which taper inwardly from an exterior surface of the stud to a floor of the notch.

According to one or more embodiments, the flange has a flange head configured to mate with a driver for rotating the flange within the at least one slat.

According to one or more embodiments, the stud may have two stud heads at opposing ends of the stud. According to one or more embodiments, the stud includes a spacer intermediate the two stud heads.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the fastener system for slatted construction are described with reference to the following figures, wherein like reference numerals refer to like parts throughout the various views unless otherwise specified.

FIG. 36 is a front view of a slatted article including an embodiment of the fastener system.

FIG. 37 is an enlarged exploded front view of the FIG. 36 embodiment.

FIG. 38 is an enlarged front view of an embodiment of the stud.

FIG. 39 is a perspective view of an embodiment of the stud and the support.

FIG. 40 is an end view of the FIG. 39 embodiment.

FIG. 41 is a front view of a slatted article including an embodiment of the fastener system.

FIG. 42 is a reduced top view of the FIG. 41 embodiment.

Figures 1, 2:
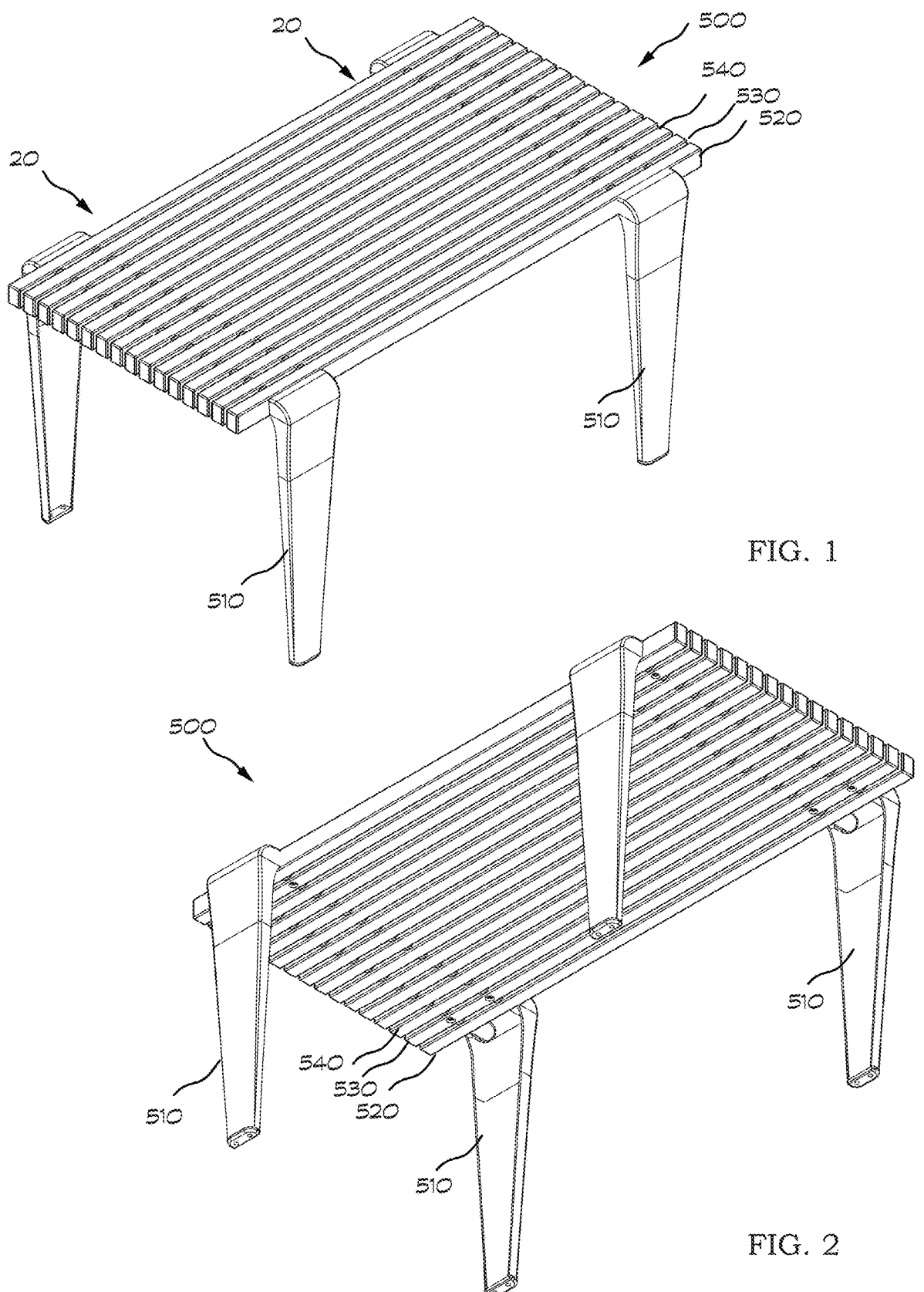
FIG. 1 is an upper perspective view of an article of slatted furniture including an embodiment of a fastener system.
FIG. 2 is a lower perspective view thereof.
Figures 3, 4, 5, 6:
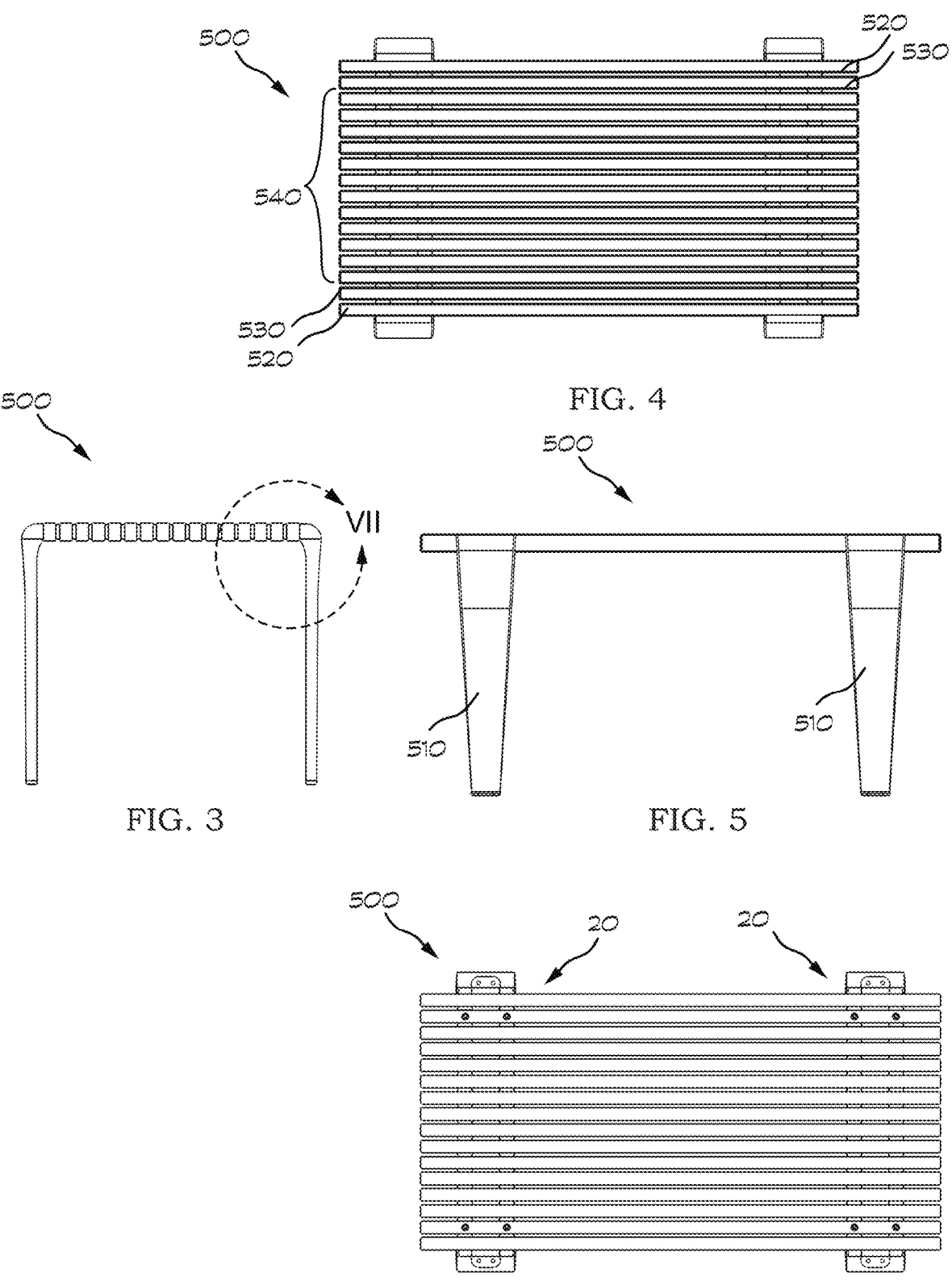
FIG. 3 is an end view thereof.
FIG. 4 is a top view thereof.
FIG. 5 is a side view thereof.
FIG. 6 is a bottom view thereof.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

LIST OF DRAWING REFERENCE NUMERALS 20 fastener system
30 stud
  32 end
  33 exterior surface
  34 stud head
  35 recess
  36 notch
  38a, 38b sidewalls
  39 floor 40 flange
  42 longitudinal channel
  44 transverse channel
  45 slot
  46 external aperture
  48 distal end
  49 flange head
  50 proximal end
60 rod
  62 rod end
70 spacer
  72 central aperture
80 retainer
90 flange tool
  92 blade
  94 shank
  96 tongue
500 slatted furniture
510 support
  512 threaded region
520 exterior slat
  522 through hole
530 second slat
  532 through hole
  534 retainer hole
540 slat
  542 through hole
580 solid member
600 slatted article
610 support
630a, 630b stud
  634 stud head
  636 notch
650 first slatted panel
652 second slatted panel
660 rod
670 spacer
710 support
  711 channel
  712 threaded region
730 stud
  732 threaded end
  734 stud head
  736 notch
770 spacer
800 slatted article
810 extruded support
900 slatted article
910 support
930 stud
  934 stud head
  936 notch
940 one or more slats
950 first slatted panel
952 second slatted panel
960 rod
1000 slatted article
1020 one or more slats
1050 first slatted panel
1052 second slatted panel
1070 spacers
1080 end connector
1082 central pin
1084 two blocks
1086 fasteners
1100 slatted article
1110 support 1120 slat
1130 stud
1180 retainer
1182 nut

DETAILED DESCRIPTION OF THE INVENTION

Referring initially to FIGS. 1-6, there are illustrated upper and lower perspective, end, top, side, and bottom views, respectively, of an article of slatted furniture generally designated 500. Slatted furniture 500 includes an embodiment of a fastener system designated 20. In general, fastener system 20 connects multiple slats to form a slatted surface, also referred to herein as a deck. Fastener system 20 connects a furniture support 510 to the deck. Support 510 may be, for example, a leg, a stand, a mounting bracket, or similar View orientations used herein are with respect to an article of furniture, where a side refers to a major dimension, an end refers to a minor dimension, the top is oriented away from a floor, and the bottom is oriented toward the floor.

As used herein, the term "shaped" means that an item has the overall appearance of a given shape even if there are minor variations from the pure form of said given shape.

As used herein, the terms "generally" or "substantially" when referring to a shape mean that an ordinary observer will perceive that an object has said shape even if there are minor variations from said shape.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein, the term "about" or "approximately" or "substantially when referring to a number refers to a range of values within plus or minus 10% of the specified number.

Figure 7:
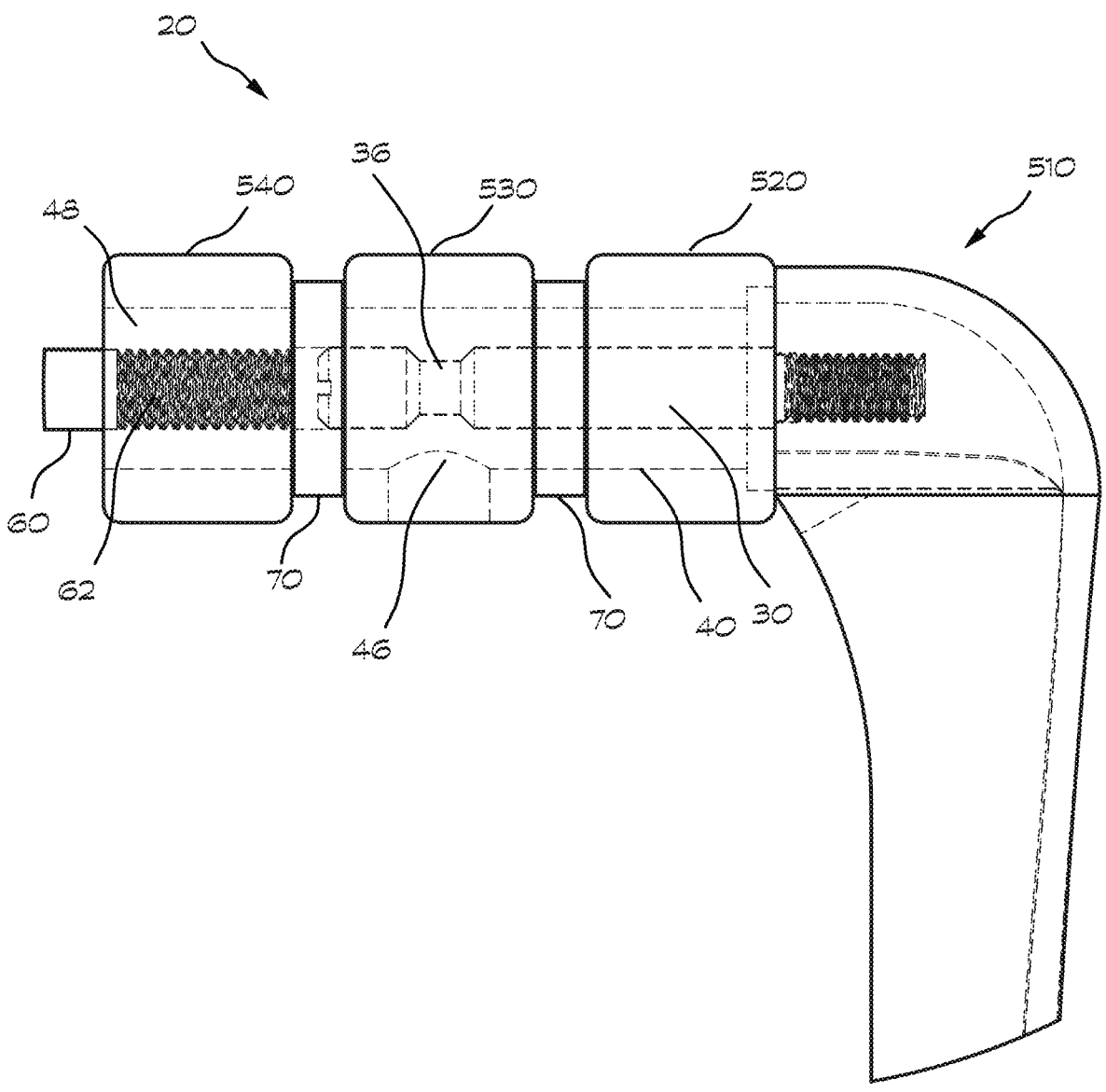
FIG. 7 is an enlarged view of region VII of FIG. 3.
Figures 8A, 8B:
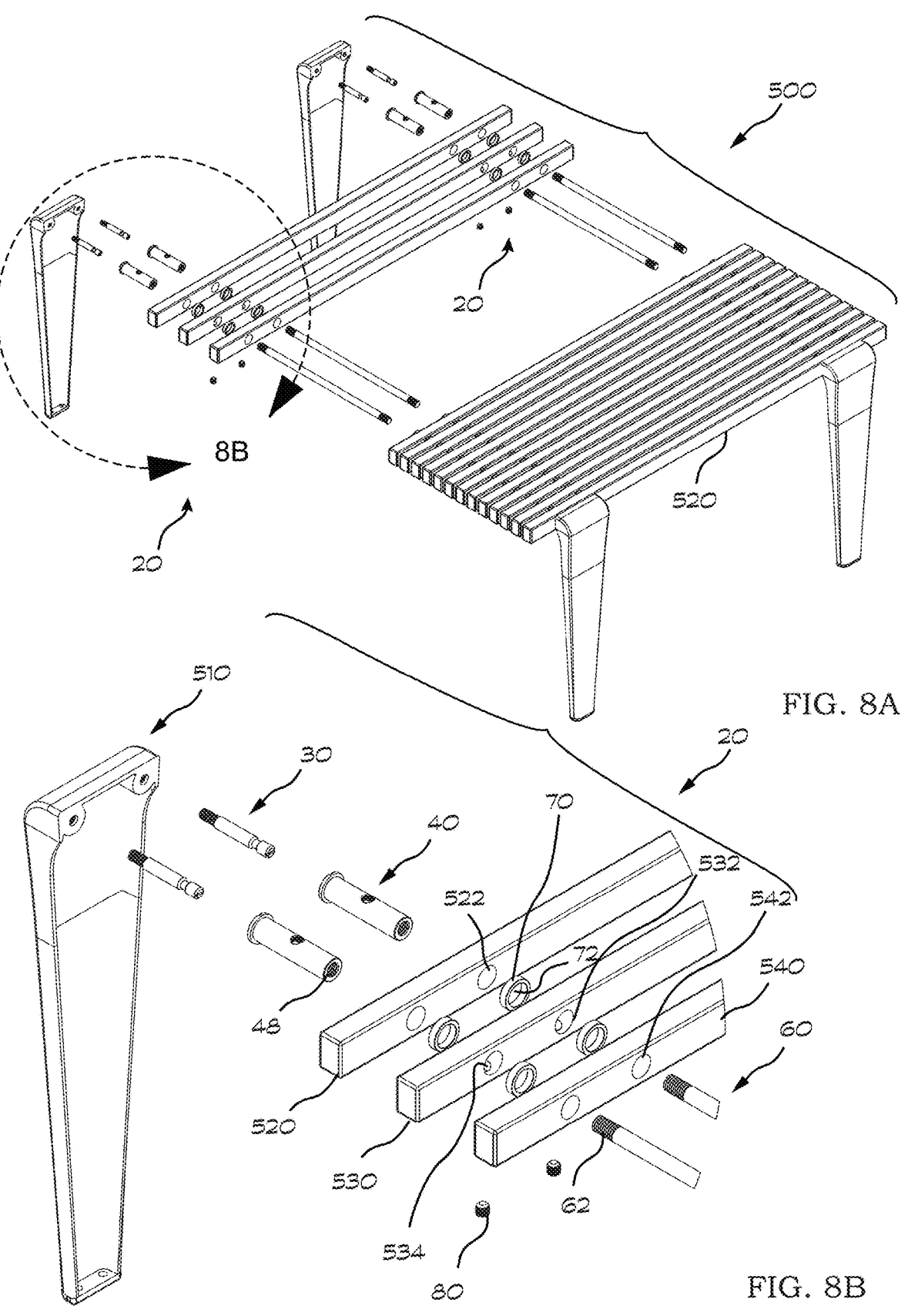
FIG. 8A is a reduced partially exploded view of an embodiment of an article of slatted furniture.
FIG. 8B is an enlarged view of region 8B of FIG. 8A.
Figures 9, 10, 11, 12:
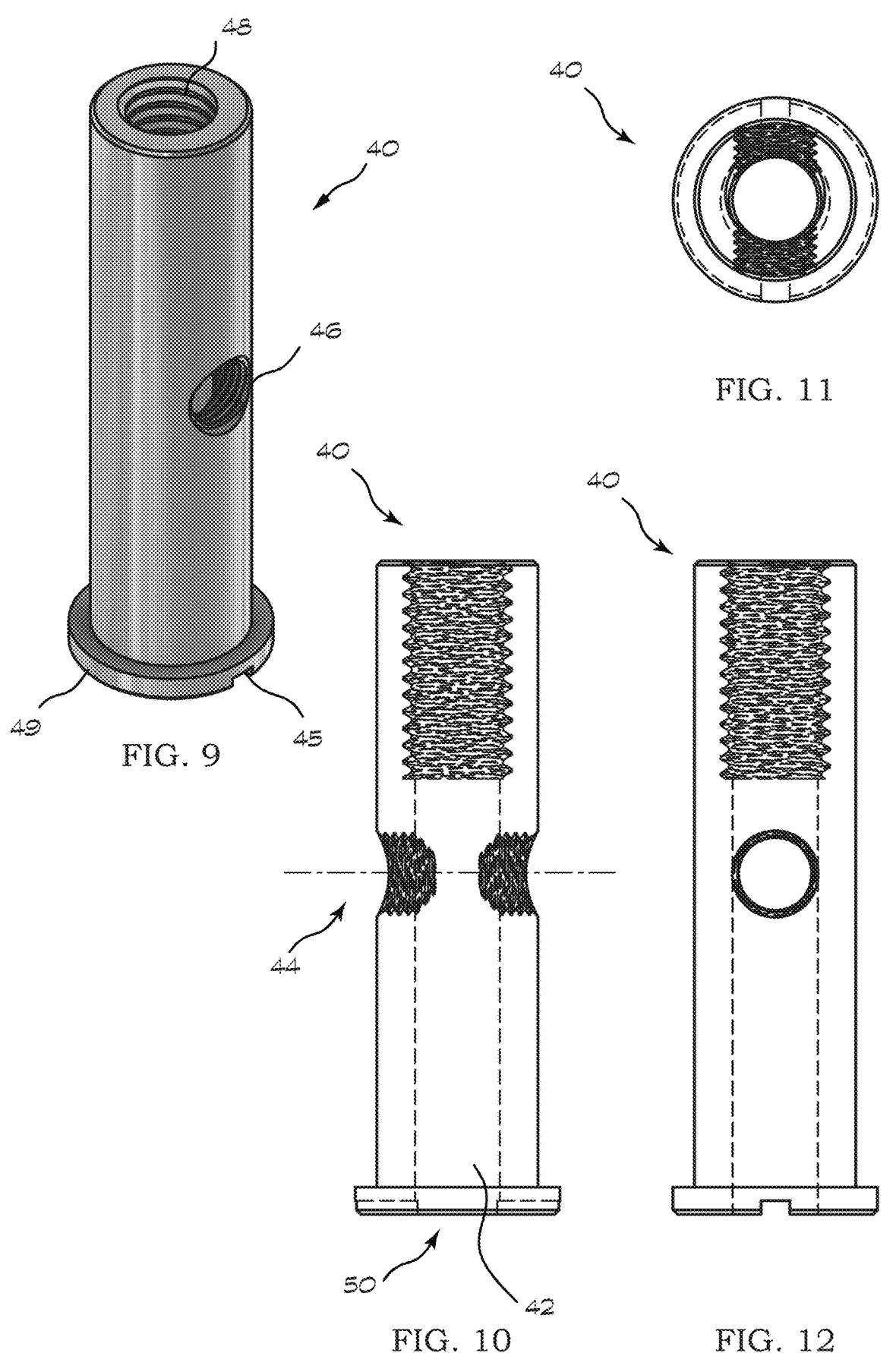
FIG. 9 is an enlarged perspective view of an embodiment of a flange of the fastener system.
FIG. 10 is an end view of the FIG. 9 embodiment.
FIG. 11 is a side view of the FIG. 9 embodiment.
FIG. 12 is a bottom view of the FIG. 9 embodiment.
Figures 13, 14, 15, 16:
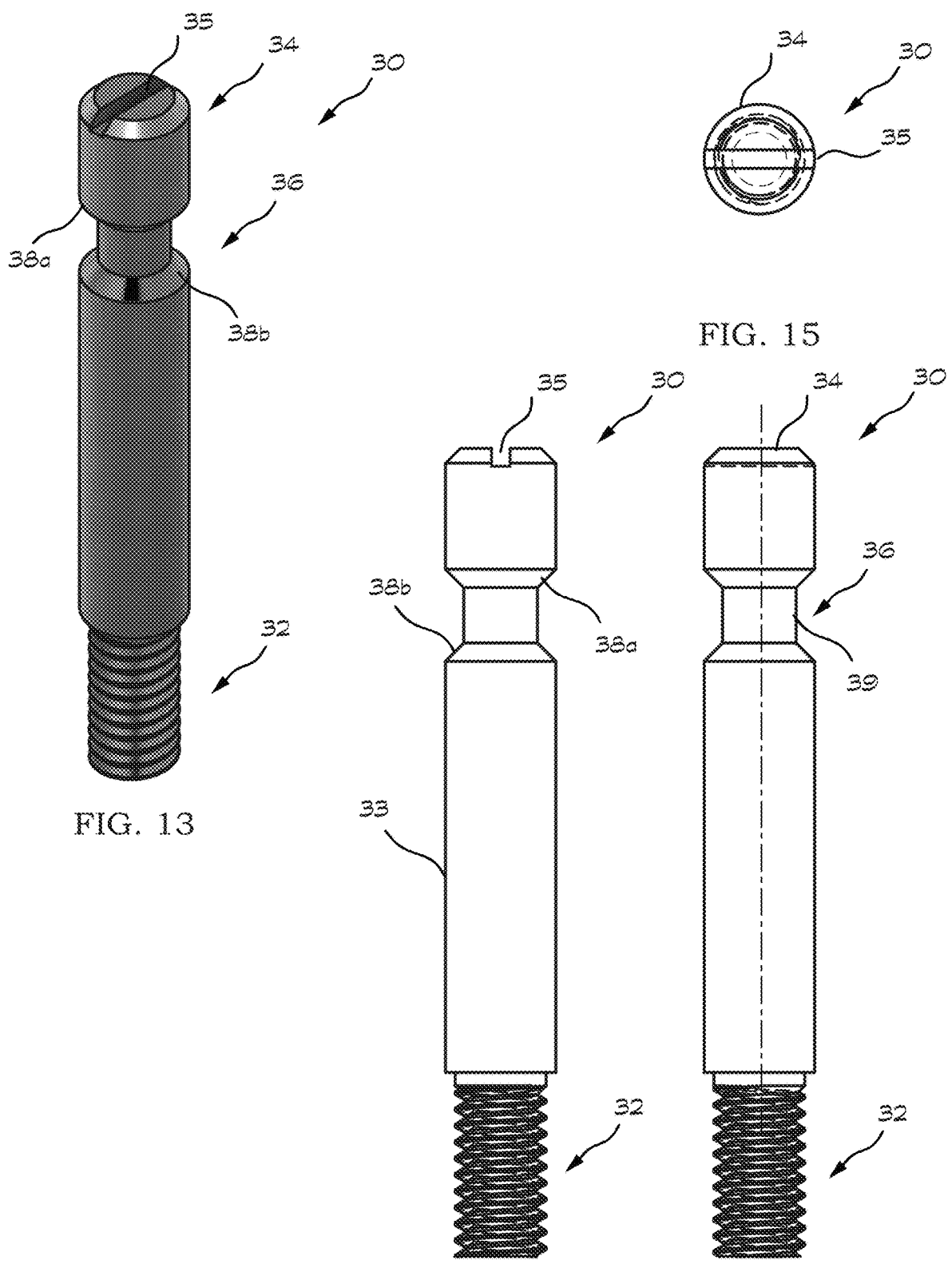
FIG. 13 is an enlarged perspective view of an embodiment of a stud of the fastener system.
FIG. 14 is an end view of the FIG. 13 embodiment.
FIG. 15 is a side view of the FIG. 13 embodiment.
FIG. 16 is a bottom view of the FIG. 13 embodiment.

Components of an embodiment of fastener system 20 are shown in the end view of FIG. 7, where hidden elements are shown in dashed lines, and in the exploded views of FIGS. 8A and 8B. In the shown embodiment, furniture 500 is a slatted bench having four supports 510, which are legs. Multiple slats (e.g., 520, 530, 540) are connected in spaced apart relation along rods 60. In the shown embodiment, four rods are present, offset from one another along the major dimension of the deck. Spacers 70 (see also FIG. 18-19) may be interposed between the slats. The deck is assembled by inserting each rod 60 alternately through a through hole (522, 532, 542) in a slat and through a central aperture 72 of a spacer, forming a deck sub-assembly.

FIGS. 9-12 are enlarged perspective, end, side, and bottom views, respectively, of a flange 40 of the fastener system. Flange 40 is shaped and dimensioned to be inserted into a through hole 522 of an exterior slat 520, and may extend through one or more additional slats (e.g. into a through hole 532 of a second slat 530). A distal end 48 of flange 40 is configured to mate with a rod end 62 of rod 60 (see also FIG. 17).

Figures 25, 26, 27, 28:
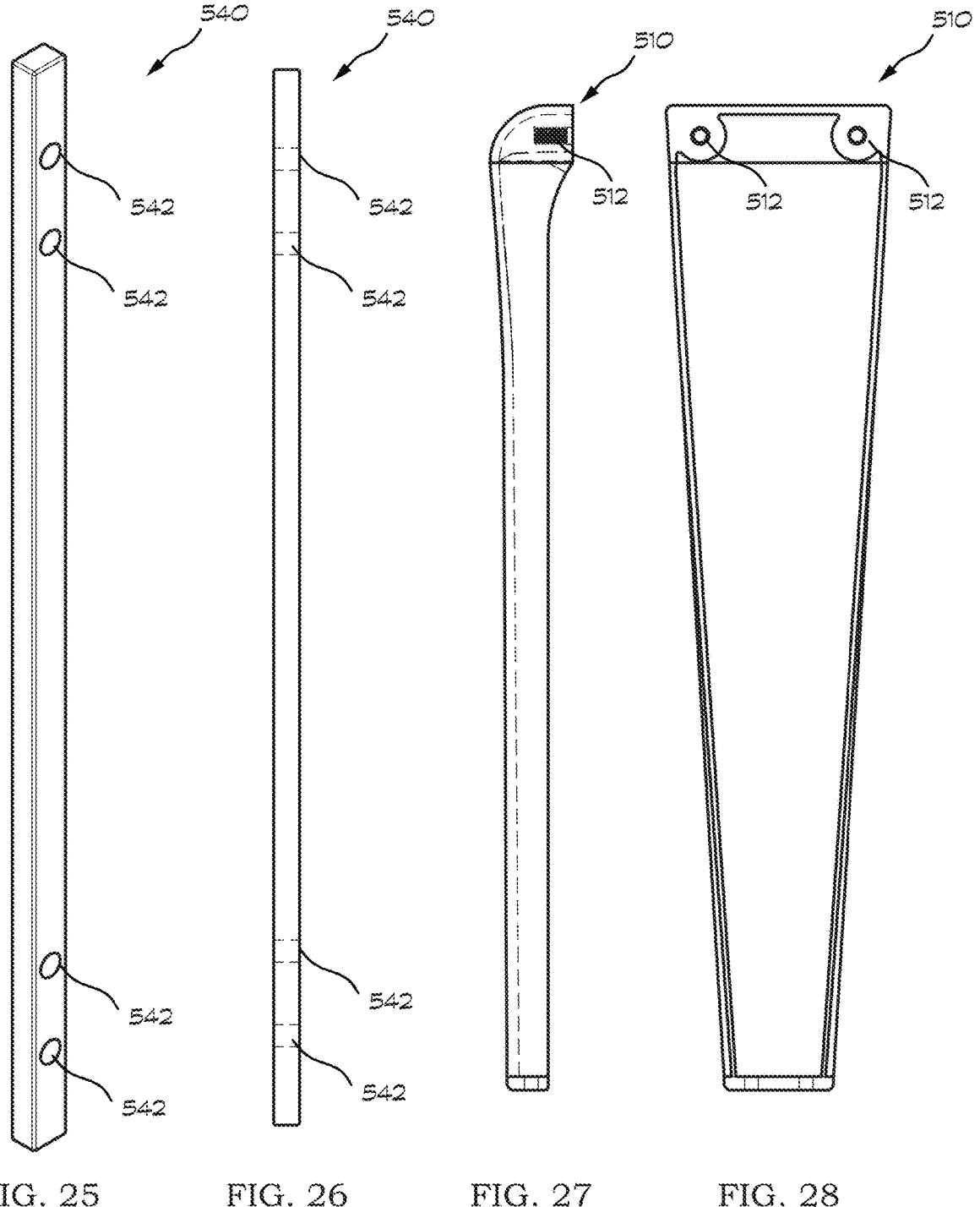
FIG. 25 is an enlarged perspective view of an embodiment of a middle slat of an article of slatted furniture.
FIG. 26 is a top view of the FIG. 25 embodiment.
FIG. 27 is an enlarged end view of an embodiment of a support of an article of slatted furniture.
FIG. 28 is a side view of the FIG. 27 embodiment.
Figures 29, 30, 31, 32, 33, 34:
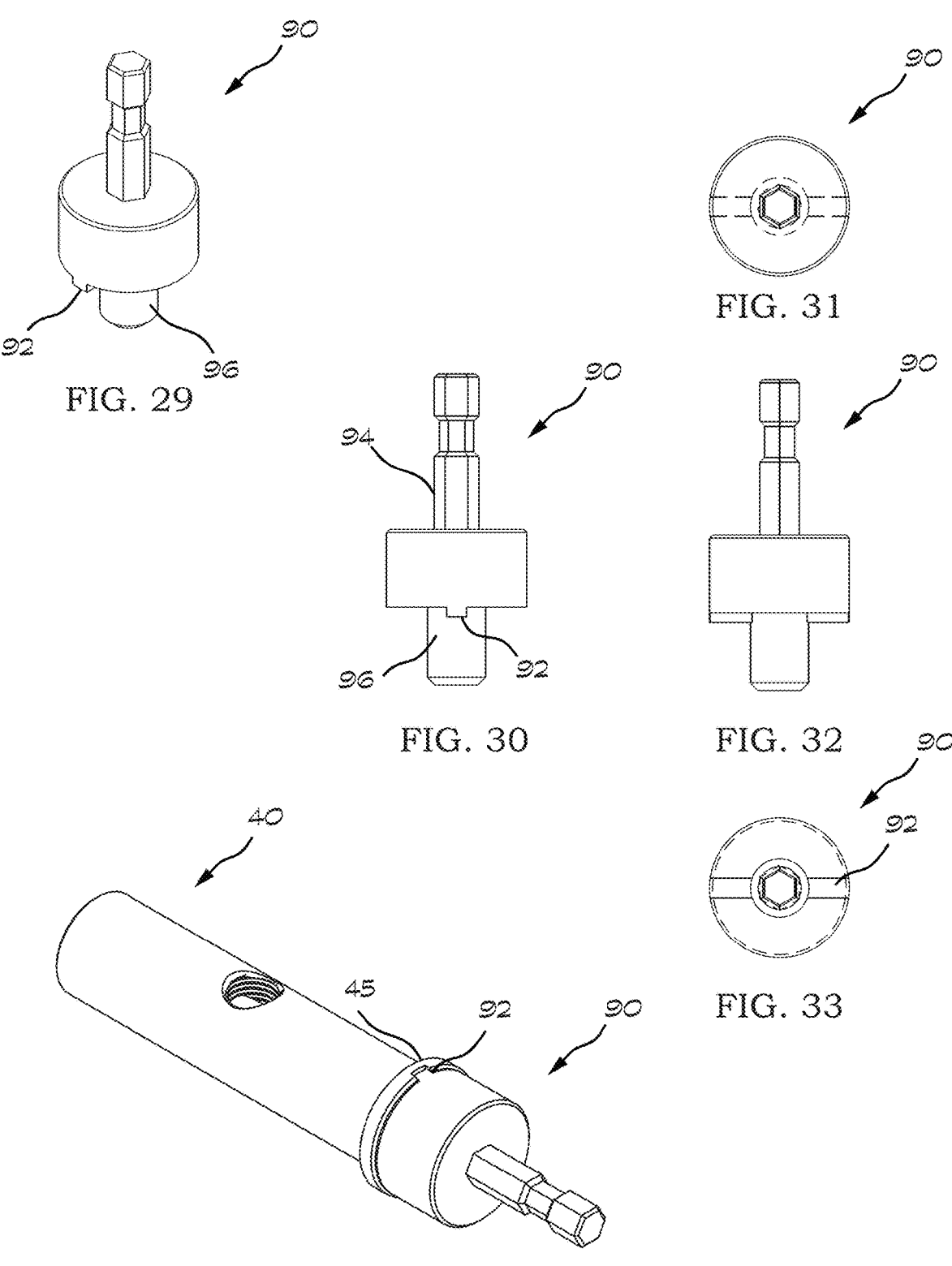
FIG. 29 is an enlarged perspective view of an embodiment of a flange tool.
FIG. 30 is a top view of the FIG. 29 embodiment.
FIG. 31 is a first side view of the FIG. 29 embodiment.
FIG. 32 is an end view of the FIG. 29 embodiment.
FIG. 33 is a second side view of the FIG. 29 embodiment.
FIG. 34 is a perspective view of the flange tool in engagement with the flange.

During assembly (refer to FIGS. 7, 8A, & 8B), rod 60 is inserted into through holes 542 of multiple slats 540. Twelve of slat 540 are present in the shown embodiment (see also FIGS. 25-26), although more or fewer slats may be used depending on the desired size of furniture. Flange 40 is inserted into exterior slat 520, through second slat 530, and distal end 48 of flange 40 mates with rod end 62 (shown internal to slat 540 in FIG. 7). In the shown example, distal end 48 has an internal thread sized to mate with an external thread of rod end 62, although other mating configurations may be used.

Figures 20, 21, 22, 23, 24:
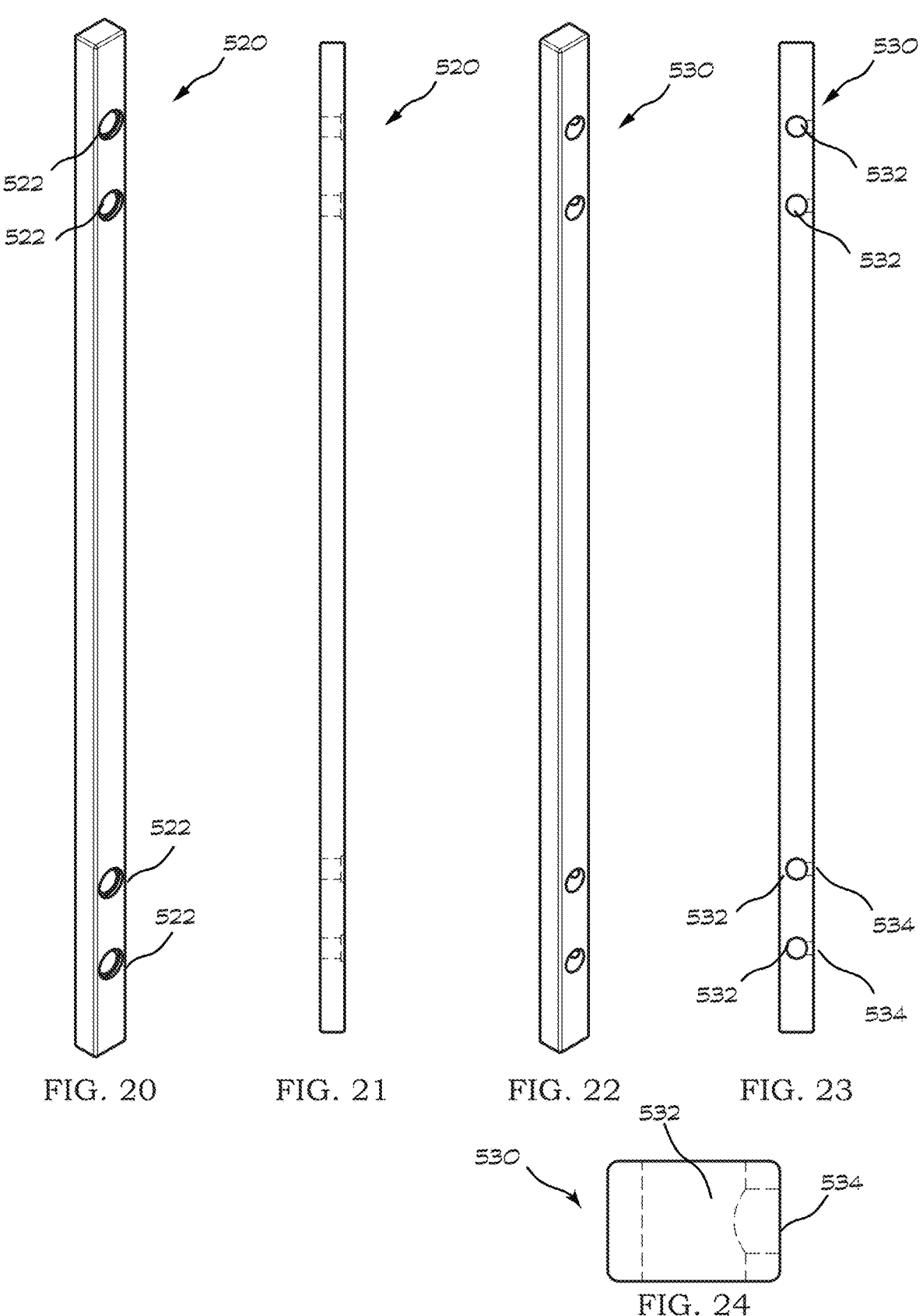
FIG. 20 is an enlarged perspective view of an embodiment of a first slat of an article of slatted furniture.
FIG. 21 is a top view of the FIG. 20 embodiment.
FIG. 22 is an enlarged perspective view of an embodiment of a second slat of an article of slatted furniture.
FIG. 23 is a side view of the FIG. 22 embodiment.
FIG. 24 is an end view of the FIG. 22 embodiment.

Flange 40 has a flange head 49. The flange head 49 may include a slot 45 suitable for insertion of a screwdriver or a custom driver, such as flange tool 90 discussed below. The shown flange head 49 has a flat exterior face configured to fit within a counter-bore of through hole 522, visible in FIGS. 20-21. The counter-bore provides a smooth exterior surface when flange 40 is assembled in exterior slat 520, and allows the surfaces of leg 510 and exterior slat 520 to closely contact one another (see FIG. 7).

Flange 40 has a longitudinal channel 42 dimensioned to receive the stud through a proximal end 50. Flange 40 also has a transverse channel 44 which opens to longitudinal channel 42. Transverse channel 44 has an external aperture 46 configured to align with a hole in bottom of one of the slats, such as retainer hole 534 of second slat 530 (shown in FIGS. 22-24). Flange 40 may be rotated within the slats to align external aperture 46 with retainer hole 534. In the shown embodiment the transverse channel goes through the entire diameter of the flange, and may therefore be aligned with retainer hole 534 in either of two positions (rotated about 180 degrees apart from one another).

FIGS. 13-16 are enlarged perspective, end, side, and bottom views, respectively, of an embodiment of a stud 30. Stud 30 is connectable to leg 510, for example in threaded region 512, shown in FIGS. 27-28. An end 32 of the shown stud has an external thread configured to mate with a threaded region 512 of leg 510. Alternative ways of mating the stud with the leg could be used, such as providing a shaft at end 32 to be mated with a hole in leg 510, with or without adhesive. A stud head 34 has a recess 35 suitable for inserting a driver. In the shown embodiment, recess 35 is suitable for a flathead screwdriver, although a recess for a hex wrench, Phillips head, or other type of driver may alternatively be provided.

In the shown embodiment, two studs 30 are assembled to each of four legs 510 by screwing threaded ends 32 into corresponding threaded regions 512. A screwdriver may be inserted into recess 35 and used to drive the stud into the leg. The assembly of a leg with mated studs is referred to herein as a support sub-assembly.

Stud 30 further includes a notch 36, shown revolved around the body of stud 30 (i.e., notch 30 may be rotationally symmetric about a longitudinal axis of the stud). Notch 36 is configured to align with external aperture 46 of the flange when the stud is inserted into the flange (see FIG. 7). The notch has angled sidewalls 38a, 38b which taper inwardly from an exterior surface 33 of the stud toward the central longitudinal axis of the stud, forming a wider opening at the outer region of the notch and a more narrow floor 39 of the notch. As shown, sidewalls 38a, 38b taper inwardly at a 45° angle, although different angles may be used to achieve the same result.

The support sub-assemblies are joined to the deck sub-assembly by inserting each stud 30 into the longitudinal channel 42 of one flange 40 to a depth where notch 36 of the stud aligns with external aperture 46 of the flange. A retainer 80, such as a set screw, is inserted through retainer hole 534 and external aperture 46 to contact floor 39 or sidewalls 38a, 38b of the notch. In the shown embodiment, transverse channel 44 is threaded for mating with a threaded retainer 80. Angled sidewalls 38a, 38b guide retainer 80 toward the narrow floor 39 of notch 36, while drawing the support sub-assembly inward to contact the deck sub-assembly.

FIGS. 29-33 are views of a flange tool 90 which may be provided with fastener system 20. Flange tool 90 may be used to rotate flange 40 within the deck sub-assembly, for the purpose of aligning external aperture 46 with retainer hole 534. In the shown embodiment, flange tool 90 has a blade 92 sized to engage slot 45 of the flange head. The tool also includes a tongue 96 which is sized to engage the flange through the longitudinal channel 44 (see FIGS. 9-12). A shank 94 is provided on the opposite side from blade 92, and may be used to grip or drive the flange tool, such as with pliers, a drill, or a bit driver. FIG. 34 illustrates how flange tool 90 may engage flange 40.

Figure 35:
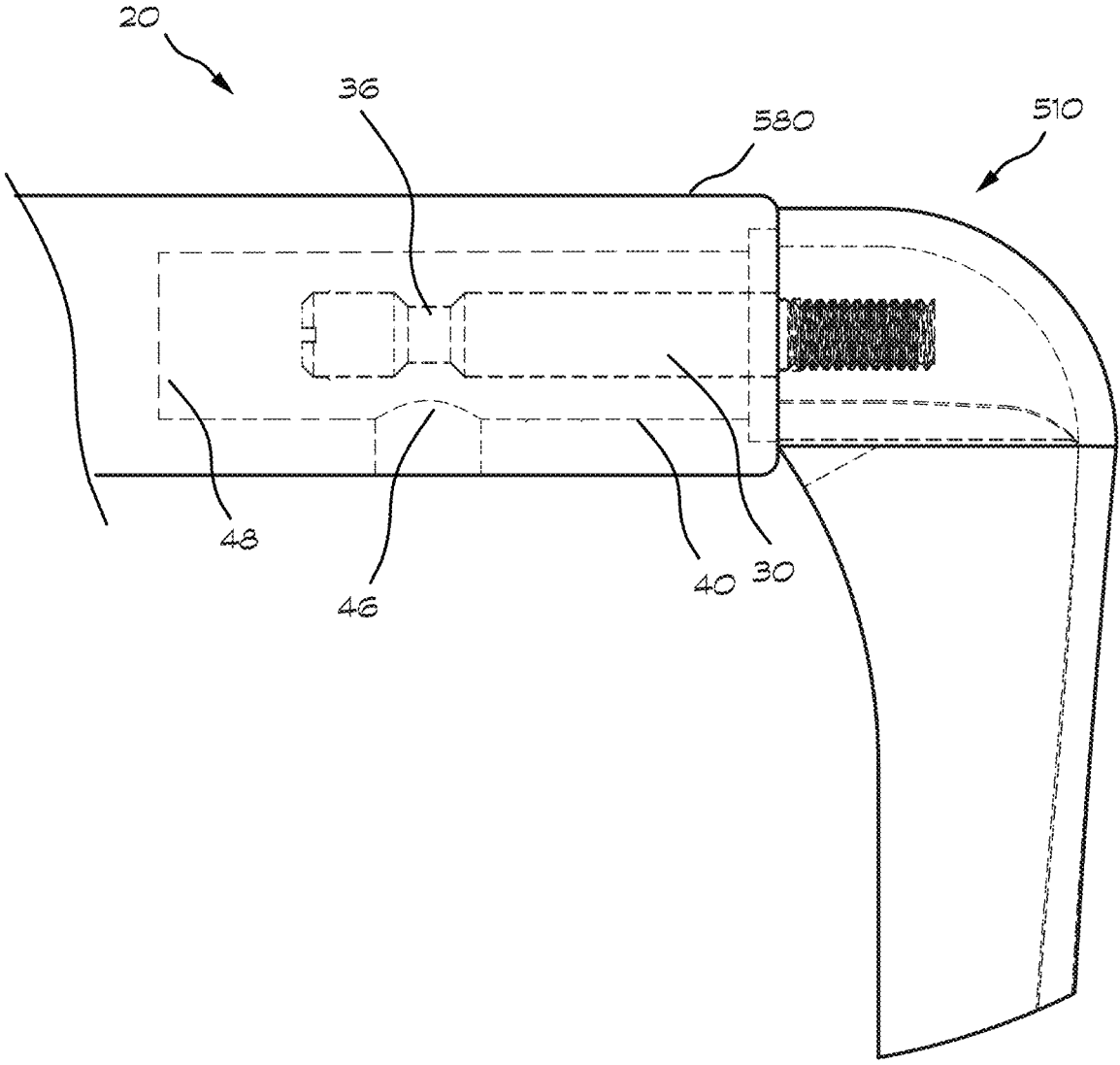
FIG. 35 is an enlarged partial end view of another embodiment of the fastener system.

FIG. 35 shows components of another embodiment of fastener system 20, for joining a support (e.g. leg 510) to a solid member 580 of the article of furniture. Solid member 580 may be, for example, a bench top, a chair seat, or a shelf. Stud 30 is connected to support 510 in the manner described above. Flange 40 is inserted into a complementary shaped hole in solid member 580, and may have features and a shape as described above. External aperture 46 of the flange is aligned with a hole in solid member 580. To join the solid member to the support, stud 30 is inserted into flange 40 and a retainer is inserted into external aperture 46 to contact notch 36 of the stud. In this manner the support is drawn inwardly to contact solid member 580. While the FIG. 35 embodiment shows support 510 being a leg, the support may take alternate forms, such as a shelf bracket which may be mounted to a wall before or after connection to solid member 580.

Figures 17, 18, 19:
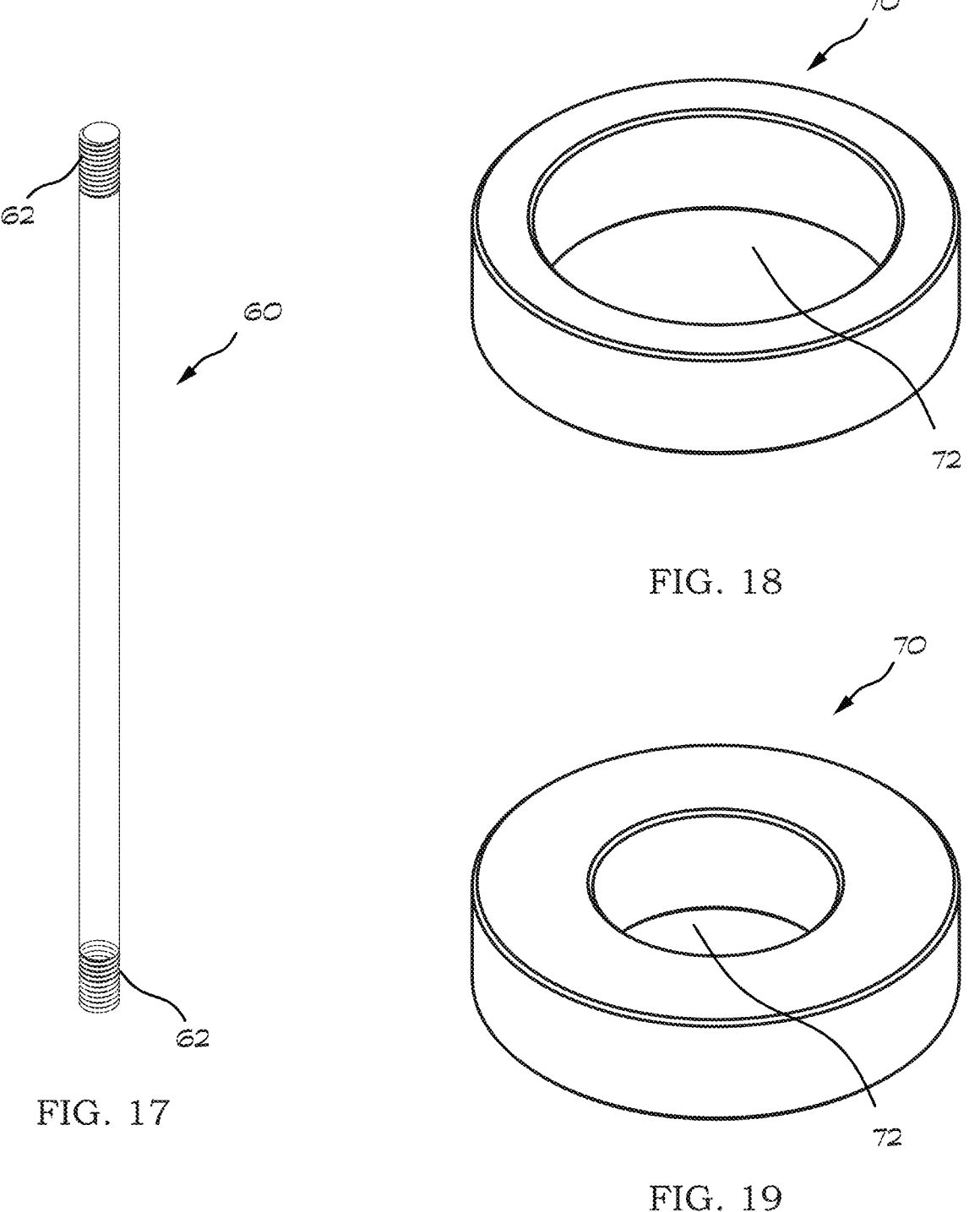
FIG. 17 is an enlarged perspective view of an embodiment of a rod of the fastener system.
FIG. 18 is an enlarged perspective view of an embodiment of a spacer of the fastener system.
FIG. 19 is an enlarged perspective view of another embodiment of a spacer of the fastener system.

The following dimensions for elements of fastener system 20 provide an exemplary embodiment suitable for a slatted bench. Flange 40 may have a length of about 3 inches and a diameter of about 0.75 inches. Stud 30 may have a length of about 2.75 inches and a diameter of about 0.375 inches. Each slat (520, 530, 540) may have a length of about 36 inches, a width of about 0.875 inches, and a height of about 1.25 inches. Spacers 70 may have an outer diameter of about 1 inch and an inner diameter (of central aperture 72) of about 0.75 inches (FIG. 18) or of about 0.5 inches (FIG. 19).

The flange, stud, and rod may be made of stainless steel or other materials suitable for fastening hardware. The slats may be made of wood, composite plastic, or other material suitable for construction of furniture or architectural members. The spacers may be formed of anodized aluminum, plastic, rubber, or other materials. The legs may be cast aluminum, wood, composite plastic, or other material suitable for furniture supports.

The supports of the shown embodiment (legs 510) are exemplary, and the system may function in a similar manner with other types of support. Support legs may be of different shape or dimensional ratio from the illustrated leg 510. More or fewer than four legs may be used to support different styles of furniture. In another embodiment, the support may be a mounting bracket for a shelf. One side of the mounting bracket may connect with studs 30 of the fastener system, while the opposite side is configured to contact a wall or other surface. In such an embodiment, supports may be present on only one side of the slatted furniture.

FIGS. 36-37 are front and enlarged exploded front views, respectively, of an exemplary slatted article 600 including an embodiment of the fastener system. In the shown embodiment, slatted article 600 includes several slatted panels (e.g., a first slatted panel 650 and a second slatted panel 652) which are connectable to one another as well as to one or more supports 610. Each slatted panel is shown constructed with four rods 660 and corresponding flanges and spacers as described elsewhere herein. It will be understood that more, or fewer, rods, flanges, and other fastener system components may be used as desired for the size of the slatted article and the application. Supports 610 may be, for example, deck or fence posts, but it is to be understood that the fastener system may be installed in a similar manner by connection to other types of support such as an extruded member, a post that is anchored in the ground, a joist, a stud, and so on. One or more studs 630a of the fastener system may be configured for connection to support 610, such as described elsewhere herein (e.g., with respect to studs 30 of FIGS. 8A-8B).

Slatted article 600 may also include one or more studs 630b configured for connecting two slatted articles to one another (e.g., first slatted panel 650 and second slatted panel 652). FIG. 38 is an enlarged front view of an embodiment of stud 630b. Studs 630b may include two stud heads 634, located at opposite ends of stud 630b. A notch 636 may be located adjacent to each stud head 634 (on other words, two notches 636 may be present on each stud 630b). Each notch 636 may include features described elsewhere herein, such as with respect to stud 30). In this manner, stud 630b may be configured for coupling to a flange of a fastener system on each end (in other words, each two stud heads 634 may couple to a flange), thereby connecting two slatted articles without a support, or intermediate to a support. Stud 630b may also include a spacer 670 located intermediate the two stud heads 634. When two slatted articles are joined with a stud having spacer 670, spacer 670 may provide the same visual appearance as other spacers of the fastener system (such as spacers 70 of FIG. 8B), so that multiple slatted articles joined with such a stud have a continuous or seamless overall appearance. This style of joining slatted articles may be used for constructing large structures such as deck surfaces, walkways, walls or partitions, docks, ceilings, and the like.

FIGS. 39-40 are perspective and end views, respectively, of an embodiment of a stud 730 a support 710. Support 710 may be an extruded member and may have any shape or length as desired for the application (e.g., supports 610 of FIGS. 36-37 may include similar features of support 710). Stud 730 may have features similar to other studs described herein, such as a stud head 734, a notch 736, a spacer 770, and a threaded end 732. Threaded end 732 may couple to a threaded region 712 of support 710; threaded region 712 may for example be a threaded square washer inserted into a channel 711 of support 710. In this manner, stud 730 may be positionable within support 710 (e.g., along the channel of the extrusion).

FIGS. 41-42 are front and reduced top views, respectively, of a slatted article 800 (e.g., a planter) including an embodiment of the fastener system. Slatted article 800 may include one or more extruded supports 810 which may have a similar structure described elsewhere herein (e.g., with respect to support 710 of FIG. 39). Examples of other slatted articles that may be constructed in a similar manner include shelving units, standing lights, bins, and so on.

Figures 43, 44, 45, 46:
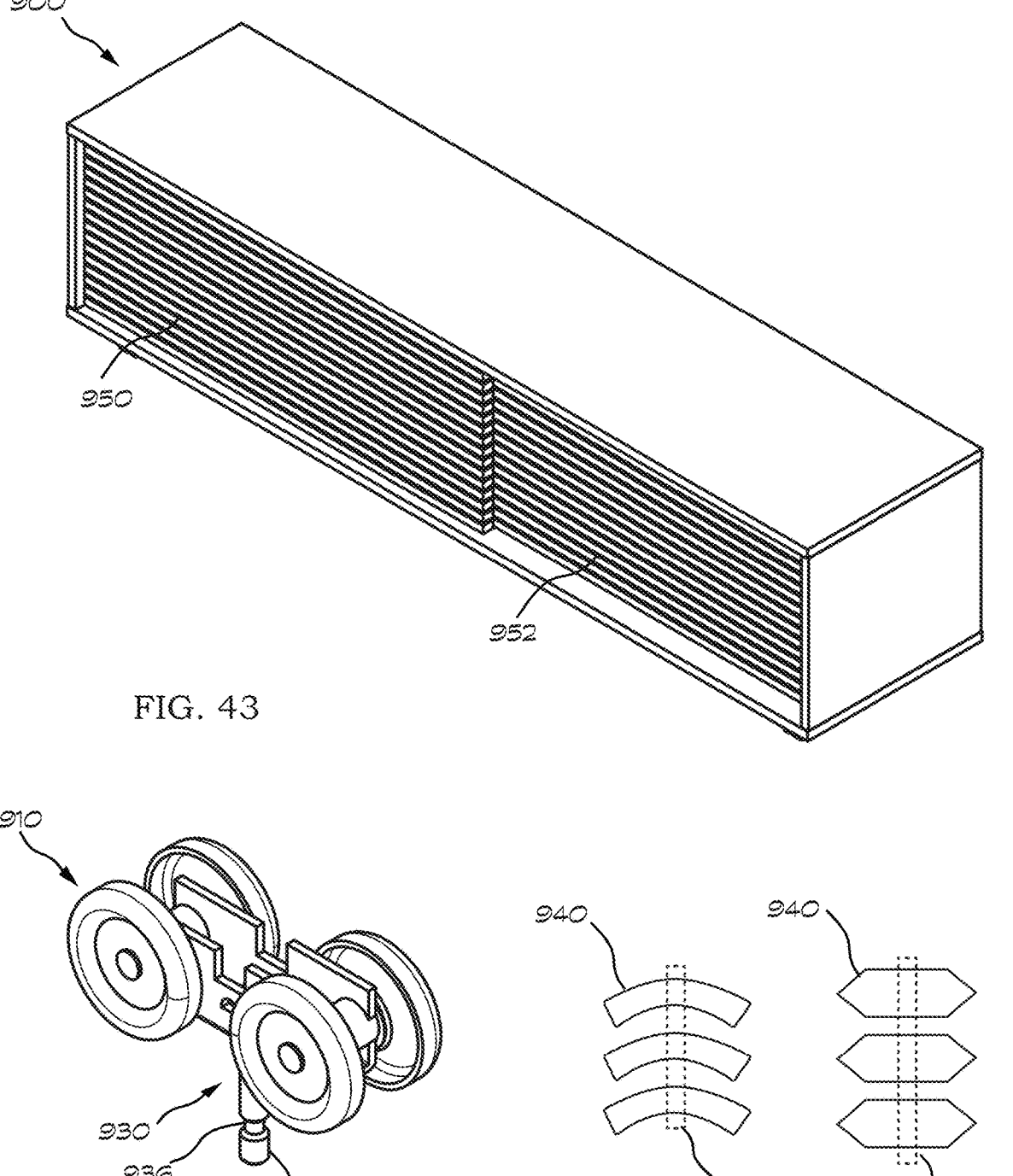
FIG. 43 is a front perspective view of a slatted article including an embodiment of the fastener system.
FIG. 44 is an enlarged perspective view of an embodiment of the stud and the support.
FIG. 45 is a schematic representation of an embodiment of the fastener system.
FIG. 46 is a schematic representation of an embodiment of the fastener system.

FIG. 43 is a front perspective view of a slatted article 900 including an embodiment of the fastener system (hidden from view in this figure). FIG. 44 is an enlarged perspective view of an embodiment of a stud 930 and a support 910, which, for example, may be used with slatted article 900 of FIG. 43. Slatted article 900 includes several slatted panels (e.g., a first slatted panel 950 and a second slatted panel 952). One or more of slatted panels 950 and 952 may be slidingly positionable within slatted article 900. Stud 930 of a slidingly positionable slatted panel may be connected to a support 910 which is a component of a track system (e.g., a wheeled component as shown in FIG. 44. Stud 930 may include other features described elsewhere herein, such as a stud head 934 and a notch 936.

FIGS. 45-46 are schematic representations of embodiments of the fastener system including one or more slats 940 and a rod 960. The shown embodiments illustrate non-rectangular profiles of slats 940. Numerous profiles of slat 940 may be envisioned; such profiles may have aesthetic appeal and/or functional features (for example, features to permit water runoff such as for exterior cladding).

Figure 47:
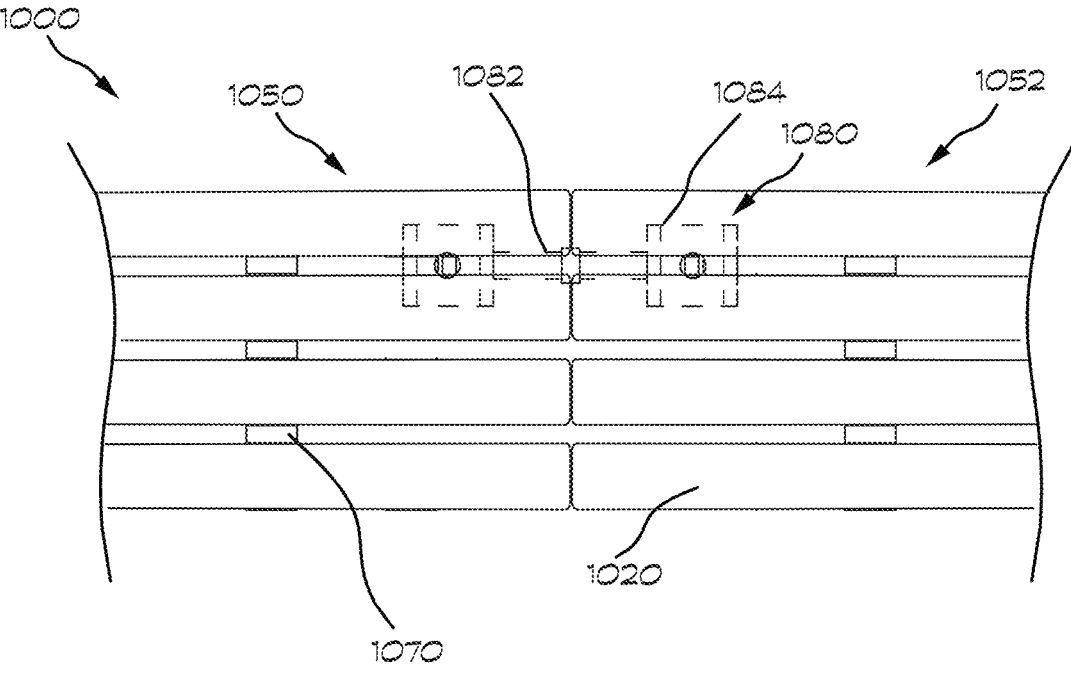
FIG. 47 is a partial bottom view of a slatted article including an embodiment of the fastener system.

FIG. 47 is a partial bottom view of a slatted article 1000 including an embodiment of the fastener system. In the shown embodiment, slatted article 1000 includes several slatted panels (e.g., a first slatted panel 1050 and a second slatted panel 1052) which are connectable to one another in an end to end arrangement. The panels may also, or instead, be connectable to one or more supports (not shown). Each slatted panel is shown constructed with spacers 1070 and rods and corresponding fastener components (hidden from view) as described elsewhere herein. First slatted panel 1050 and second slatted panel 1052 may be connected by one or more end connectors 1080 (shown partially hidden as indicated by dashed lines). By using a combination of end connectors 1080 and studs 630b (see FIG. 37), slatted panels may be joined in multiple directions. This type of arrangement may be useful for construction of large and or irregularly shaped items, such as decks or walkways.

Figure 48:
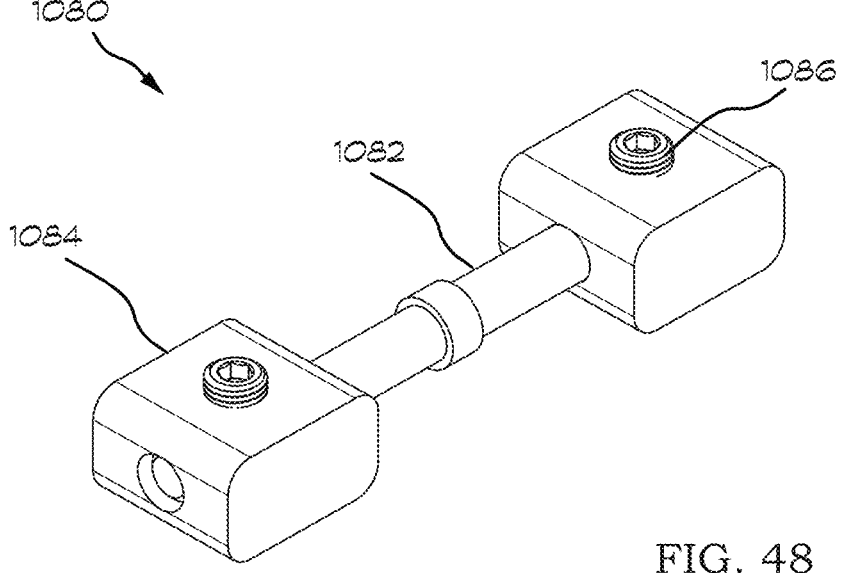
FIG. 48 is an enlarged perspective view of an embodiment of the fastener system.

FIG. 48 is an enlarged perspective view of an embodiment of an end connector 1080. End connector 1080 includes a central pin 1082 having two opposing ends. Two blocks 1084 each receive one end of central pin 1082. Central pin 1082 may be joined to the two blocks 1084 by fasteners 1086, which may be a set screw or similar Each blocks 1084 may be fitted into a pocket machined into one or more slats 1020. When installed, end connector 1080 may be partially or completely concealed within first slatted panel 1050 and second slatted panel 1052. Components of end connector 1080 may be constructed of metal, wood, or other materials suitable for joining slatted articles.

Figures 49, 50:
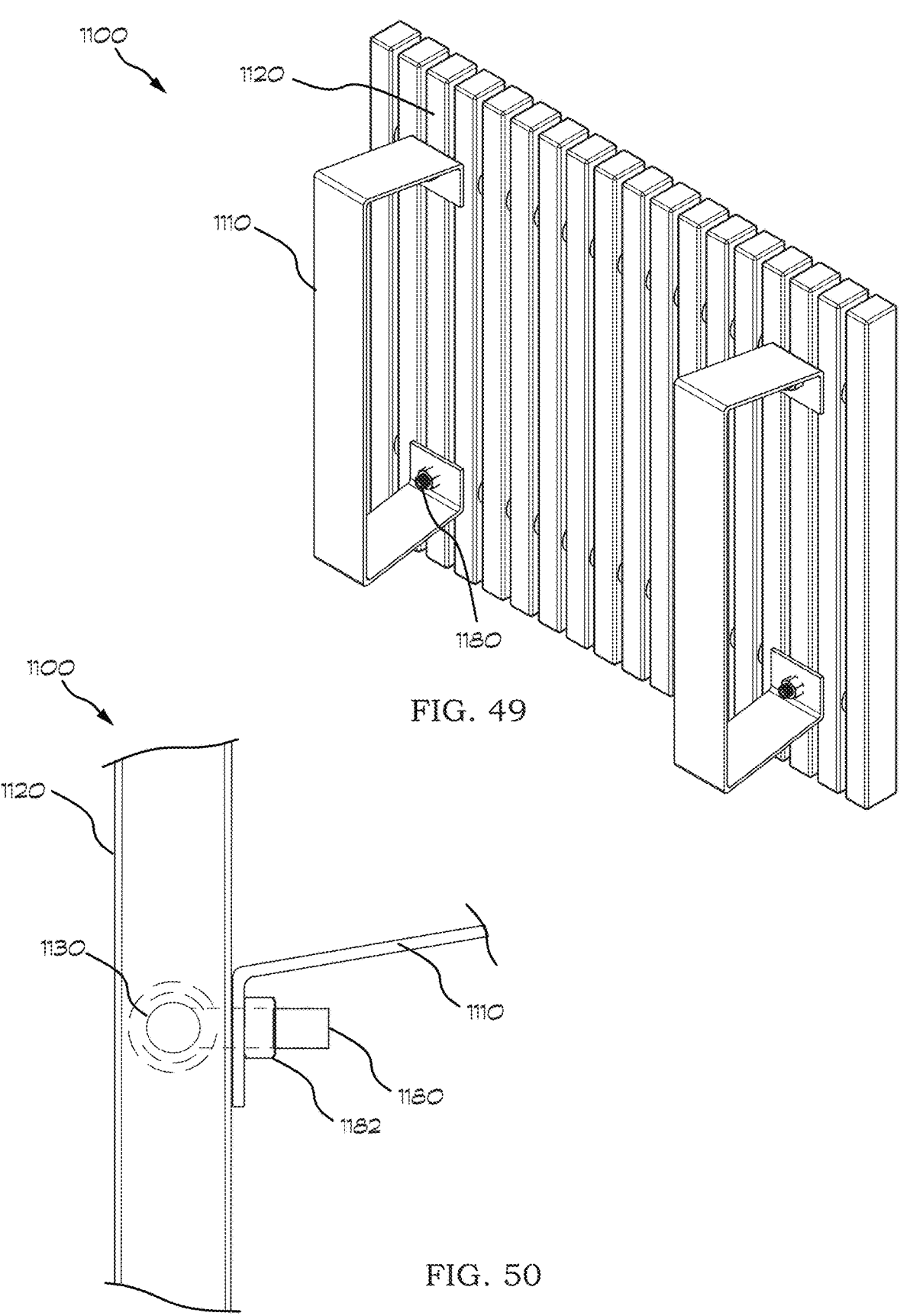
FIG. 49 is a bottom perspective view of a slatted article including an embodiment of the fastener system.
FIG. 50 is an enlarged partial side view of an embodiment of the fastener system.

FIG. 49 is a bottom perspective view of a slatted article 1100 including an embodiment of the fastener system. Slatted article 1100 includes one or more supports 1110, which may be legs, mounting brackets, or another kind of support. Supports 1110 are connectable to the bottom of one or more slats 1120 of slatted article 1100, by connecting to a retainer 1180 of the fastener system.

FIG. 50 is an enlarged partial side view of the fastener system of slatted article 1100. Retainer 1180, which may be a set screw or other fastener as described elsewhere herein, is inserted through a retainer hole in slat 1120 and retains a stud 1130 within slat 1120. By having a retainer 1180 that is sized to extend downwardly from slat 1120, additional components may be connected to retainer 1180. Said another way, retainer 1180 may be used for both retaining stud 1130 in slat 1120 and for connecting a support 1110 or additional item to slat 1120. As shown, support 1110 may have a hole through which retainer 1180 may pass. A nut 1182, or similar device, may be used to connect support 1110 to retainer 1180.

Furthermore, while embodiments discussed herein may refer to connecting multiple slats in a substantially flat arrangement, slatted articles having curved shapes may also be formed using one or more fastener systems of this disclosure. For example, using assembly methods disclosed slats or slat assemblies may be connected on a bent threaded rod or hoop. Such assemblies may be interconnected in numerous arrangements to provide slatted articles that are circular, rounded, serpentine, or irregularly shaped.

Further provided is a slatted article, wherein fastener system 20 is packaged with the slats, supports, and other components for construction of the slatted article. In other embodiments, the components of the fastener system may be packaged independently of the other pieces useful for construction of the slatted article (e.g., the slats). Embodiments may optionally include a flange tool.

In terms of use, a method of assembling a slatted article includes: (refer to FIGS. 1-35)

a. providing a plurality of slats (520, 530, 540), each having a through hole (522, 532, 542), one of the plurality of slats having a retainer hole 534;

b. providing a support 510;

c. providing a fastener system 20 including:

i. a stud 30 configured for connection to the support;

ii. a flange 40 configured for insertion into at least one of the plurality of slats, the flange having: a longitudinal channel 42 having a proximal end 50 dimensioned to receive the stud therethrough and an opposing distal end 48; a transverse channel 44 oriented substantially orthogonally to the longitudinal channel and opening thereto; and an external aperture 46 opening to the transverse channel;

iii. a rod 60 configured to connect two or more of the plurality of slats, the rod having a rod end 62 which is configured to mate with the distal end of the flange; and iv. a notch 36 in the stud positioned to align with the external aperture of the flange when the stud is inserted therethrough;

d. building a support sub-assembly by mating the stud to the support;

e. building a deck sub-assembly by inserting the rod through two or more of the plurality of slats;

f. inserting the flange into at least one of the plurality of slats and mating the rod end with the distal end of the flange;

g. rotating the flange with the rod mated therewith within the deck sub-assembly to position the external aperture of the flange for access through the retainer hole;

h. inserting the stud of the support sub-assembly through the proximal end of the flange into the longitudinal channel, so that the notch of the stud aligns with the external aperture of the flange; and i. fastening the support sub-assembly and deck sub-assembly to one another by inserting a retainer 80 through the retainer hole of the slat and through the external aperture in the flange to contact the notch of the stud, thereby retaining the stud within the flange and drawing the support sub-assembly toward the deck sub-assembly.

The method further including: providing a plurality of spacers 70; and, in (e), positioning one of the plurality of spacers between each slat of the deck sub-assembly and inserting the rod therethrough.

The method further including: providing a driver 90; in (c)(ii), the flange having a flange head 49 configured to mate with the driver; and, in (g), mating the driver with the flange head and rotating the flange with the rod mated therewith with the driver.

The embodiments of the fastener system and methods of use described herein are exemplary and numerous modifications, combinations, variations, and rearrangements can be readily envisioned to achieve an equivalent result. Further, nothing in the above-provided discussions of the system and method should be construed as limiting the invention to a particular embodiment or combination of embodiments. The scope of the invention is defined by the appended claims.

I claim:

1. A slatted article comprising:

a plurality of slats, each having a through hole, one of the plurality of slats having a retainer hole;

a support;

a stud configured for connection to the support;

a flange configured for insertion into at least one of the plurality of slats, the flange having: a longitudinal channel having a proximal end dimensioned to receive the stud therethrough and an opposing distal end; a transverse channel oriented substantially orthogonally to the longitudinal channel and opening thereto; and an external aperture opening to the transverse channel;

a rod configured to connect two or more of the plurality of slats, the rod having a rod end which is configured to mate with the distal end of the flange; and wherein, the flange is rotatable within the at least one slat to position the external aperture of the flange for access through the retainer hole.

2. The slatted article of claim 1, wherein the support is connectable to the plurality of slats by connecting the stud to the support, inserting the flange into at least one of the plurality of slats, connecting the rod to two or more of the plurality of slats and mating the rod end with the distal end of the flange, and inserting the stud through the proximal end of the flange.

3. The slatted article of claim 1, wherein the rod is configured to be freely rotatable within the through holes of the connected plurality of slats.

4. The slatted article of claim 1, wherein the transverse channel passes through a diameter of the flange and two opposing external apertures open to the transverse channel.

5. The slatted article of claim 1, further including a retainer configured for insertion through the external aperture of the flange into the transverse channel and engagement with the stud.

6. The slatted article of claim 1, wherein the stud is configured for positionable connection along a length of the support.

7. The slatted article of claim 1, wherein the support is an extruded member.

8. The slatted article of claim 1, wherein the flange has a flange head configured to mate with a driver for rotating the flange within the at least one slat.

9. The slatted article of claim 1, further including:

the stud having two stud heads at opposing ends of the stud;

two or more flanges, each flange of the two or more flanges configured for insertion into at least one slat; and wherein, when each of the two stud heads is inserted through one of the two or more flanges, a portion of the stud is positioned to align with the external aperture of each flange.

10. The slatted article of claim 9, wherein the stud includes a spacer intermediate the two stud heads.

11. The slatted article of claim 1, wherein the retainer is sized to extend downwardly from one of the plurality of slats and the support is connectable to the retainer.

12. The slatted article of claim 1, further including:

a central pin having two opposing ends;

two blocks, each of the two blocks configured to receive one of the two opposing ends of the central pin; and a pocket in each of two of the plurality of slats, each pocket shaped and dimensioned for insertion of one of the two blocks therein.

* * * * *